United States Patent

[11] 3,542,375

[72] Inventor William C. Renwick
Midland, Michigan
[21] Appl. No. 841,643
[22] Filed April 9, 1969
Division of Ser. No. 571,487, Aug. 10, 1966, now Pat. No. 3,476,842
[45] Patented Nov. 24, 1970
[73] Assignee Dow Corning Corporation
Midland, Michigan
a corporation of Michigan

[54] JOINT SEALING COMPOSITE WITH HEAT ACTIVATING COMPONENT
3 Claims, 12 Drawing Figs.
[52] U.S. Cl. ................................................. 277/22,
277/229, 277/235, 277/34
[51] Int. Cl. .................................................. F16j 15/16,
B29c 27/00
[50] Field of Search ........................................ 277/22, 34,
226, 229, 235; 52/396; 264/47

[56] References Cited
UNITED STATES PATENTS
2,898,634  8/1959  Alderfer ..................... 264/47
3,061,895  11/1962  Kleinhans ................... 277/226X
3,125,346  3/1964  Poltorak ..................... 277/34X Primary Examiner—Samuel Rothberg
Attorneys—Robert F. Fleming, Jr., Laurence R. Hobey, Harry D. Dingman and Howard W. Hermann ABSTRACT: There is disclosed a composite for sealing joints, particularly building joints. A flat tape is formed into a U-shape, and an uncured elastomer with a blowing agent is extruded into the tape. The tape is placed into the joint to be sealed, and heat is applied to activate the blowing agent causing expansion of the elastomer to fill the joint. An electrical resistance element can be included in the elastomer for applying heat thereto.

Patented Nov. 24, 1970

INVENTOR.
William G. Renwick

ATTORNEY

INVENTOR.
William C. Renwick

Howard W. Hermann
ATTORNEY

JOINT SEALING COMPOSITE WITH HEAT ACTIVATING COMPONENT

The present invention, a division of U.S. Pat. application Ser. No. 571,487, filed Aug. 10, 1966, now U.S. Pat. No. 3,476,842, relates to sealing of joints and has particular application in building construction where it is desirable to waterproof a joint between two substantially parallel surfaces which are spaced apart by a distance which may vary due to thermal expansion and contraction or other reasons.

In building construction is is a common practice to provide space between adjacent panels or sections to allow for thermal expansion and contraction and other changes in dimensions. If these joints are exposed to weather, the joints must be sealed if the building is to be waterproof. Various types of sealing methods have, in the past, been used for this purpose. These include, for example, the injection into the joint, by means of a hand- or pressure-operated gun or the like, of liquid caulking compound which is designed to cure within the joint. Another type of building sealant is the provision of a tubular member which may be of elastomeric material and which is cemented in the joint.

A problem with these prior sealing methods exists in that as the building panels change dimensions due to thermal expansion and contraction, sealing material tends to pull away from the surface of the panels thereby causing leakage. A further disadvantage in the prior art methods is the high labor costs involved in installing a good sealing system. Even with a liquid caulk applied from a caulking gun, skilled labor is required in order to apply an even appearing caulk surface.

An object of the present invention is the provision of a joint sealing material which may be applied with a minimum of skilled labor.

A more specific object of the present invention is to provide an improved sealing structure which is capable of substantial expansion and contraction to allow for changes in joint dimensions.

In accordance with these and other objects, there is provided by the present invention a novel joint sealing structure which comprises a tubular jacket having means associated therewith which cause the jacket to open longitudinally upon application of pressure from within and a quantity of elastomeric material surrounded by the tubular jacket. The elastomeric material includes as an ingredient thereof means for causing the elastomeric material to foam and expand upon application of heat.

Other objects and advantages of the present invention will become obvious to those skilled in the art from a study of the following detailed description when considered in connection with the accompanying drawings wherein.

Figure 1:
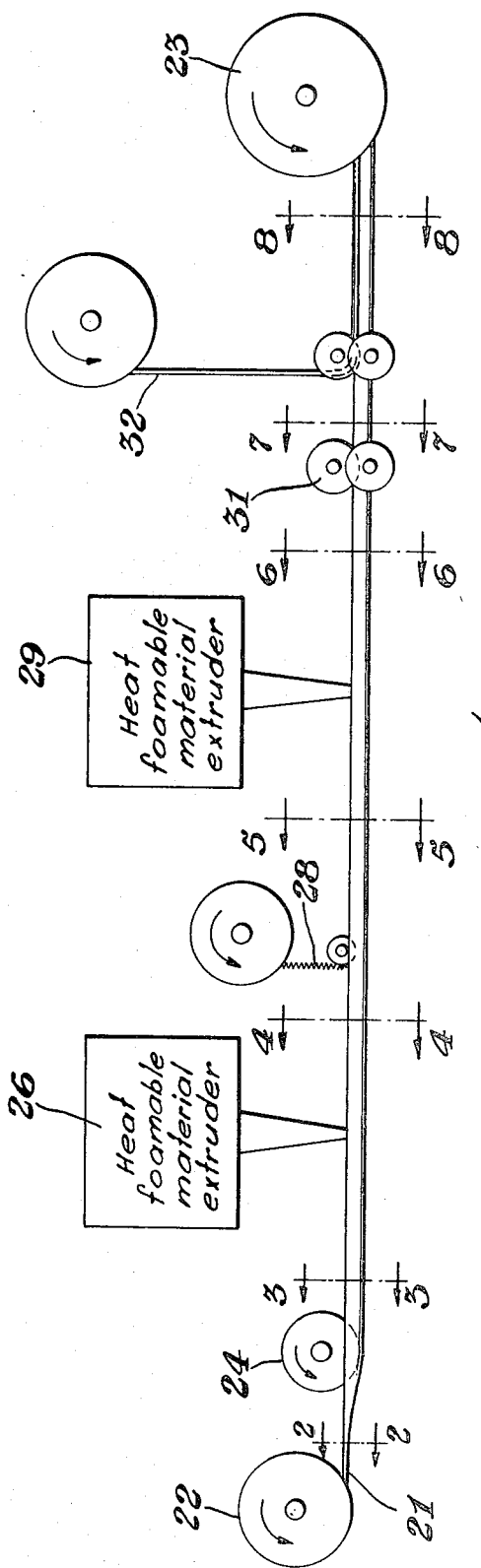
FIG. 1 is a diagrammatic view of a method of making joint sealing material in accordance with the present invention.
Figure 2:
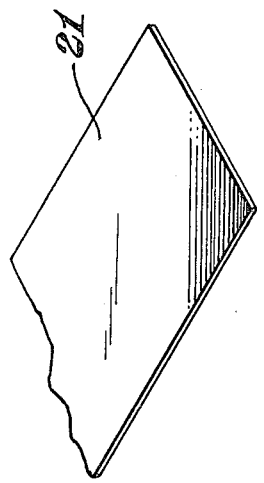
FIG. 2 is an isometric view, partly in cross section, of the joint sealing member of FIG. 1 taken along line 2—2 of FIG. 1.
Figure 4:
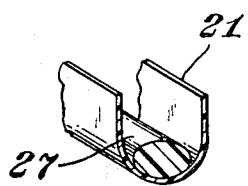
FIG. 4 is an isometric view, partly in cross section, of the sealing member of FIG. 1 taken along the line 4—4 of FIG. 1.

Referring now to the drawings wherein like reference numerals designate like or corresponding parts throughout the figures thereof, there is illustrated in FIG. 1, which is a schematic view of the preferred process for making joint sealing material in accordance with this invention, a tape or strip 21 fed from a feed reel 22 to a takeup reel 23, FIG. 2 illustrates the configuration of the strip as it leaves the feed reel 22. The strip may be of any desired width and may be made, for example, of elastomeric or yieldable plastic material.

Figure 3:
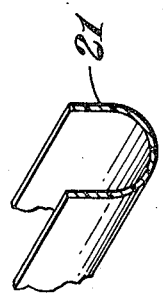
FIG. 3 is an isometric view, partly in cross section, of the joint sealing member of FIG. 1 taken along the line 3—3 of FIG. 1.

After the strip leaves the feed reel 22, it is fed through a forming station 24 where it is deformed to a U-shaped or trough shaped configuration as illustrated in FIG. 3. A heat-foamable uncured elastomeric material is now fed from an extruder into the open top of the U-shaped strip from an extruder 26 forming a layer 27 of the heat-foamable material in the strip. While a variety of heat-foamable materials may be utilized for this purpose, a silicone elastomer is preferred due to its stability with varying temperatures. The raw elastomer may include any suitable blowing agent; such as, for example, a mixture of 70 percent N,N'-dimethyl-N,N'-dinitrosoterephthalamide and 30 percent white mineral oil. This material undergoes a controlled thermal decomposition liberating nitrogen at 100°C. with a residue of dimethyl terephthalate. Various other elastomeric materials and blowing agents are known to those skilled in the art and need not be described in great detail herein.

Figure 5:
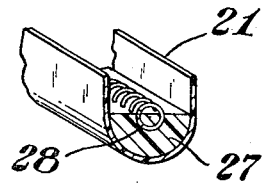
FIG. 5 is an isometric view, partly in cross section, of the joint sealing member of FIG. 1 taken along the line 5—5 of FIG. 1.
Figure 6:
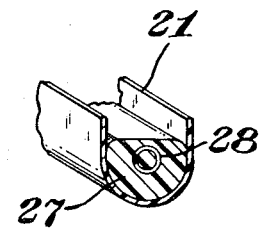
FIG. 6 is an isometric view, partly in cross section, of the joint sealing member of FIG. 1 taken along the line 6—6 of FIG. 1.
Figure 7:
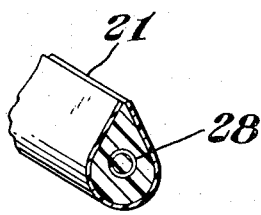
FIG. 7 is an isometric view, partly in cross section, of the joint sealing member of FIG. 1 taken along the line 7—7 of FIG. 1.
Figure 8:
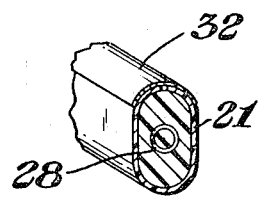
FIG. 8 is an isometric view, partly in cross section, of the joint sealing member of FIG. 1 taken along the line 8—8 of FIG. 1.

After the heat-foamable material from the extruder 26 is deposited in the strip 21, an electrical resistance wire 28 is embedded into the material, as may be seen more clearly from FIG. 5. While a coiled resistance wire as illustrated is preferred, to allow stretching of the finished product, it is to be understood that other configurations of electrically resistive materials may also be used. If desired, a second layer of heat-foamable, elastomeric material 27 may be applied over the resistance wire by a second extruder 29 resulting in the configuration shown in FIG. 6. The strip 21 is then fed through a shaping station 31 which closes the top of the U-shaped strip configuration as may be seen from FIG. 7. A sealing strip 32 may be, for example, a thin pressure sensitive adhesive tape is placed over the joint between the two edges of the tape 21 and the resulting novel-shaped structure shown in FIG. 8 is wound on the takeup reel 23 ready for use.

Figure 9:
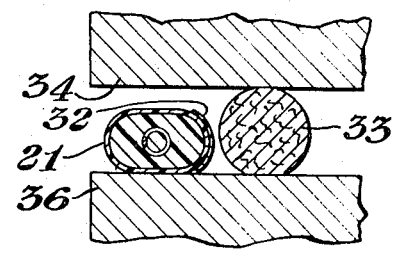
FIG. 9 is a cross-sectional view showing the first step of installation of the joint sealing in a building joint.
Figure 10:
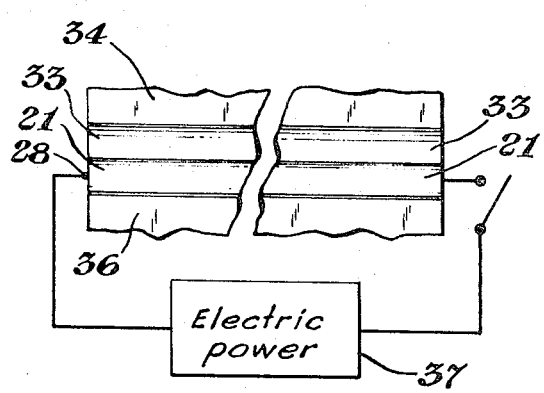
FIG. 10 is an elevational view, partly schematic, illustrating the second step of installing the joint sealing material in a building joint.
Figure 11:
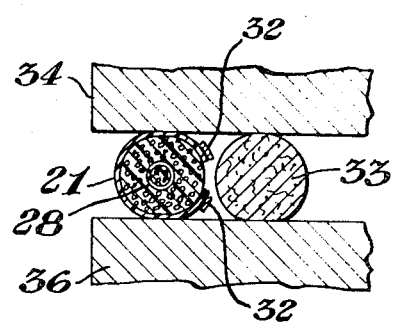
FIG. 11 is a cross-sectional view illustrating a third step in sealing a joint with the sealing material of the present invention.
Figure 12:
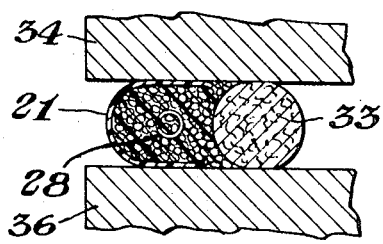
FIG. 12 is a cross-sectional view illustrating the completed sealed joint of FIGS. 9—11.

In the application of the joint sealing material to a building joint, it is preferred to place a backing material 33 in the joint between the two surfaces 34-36 which are to be sealed. Backing materials for such purposes are known in the art and may be, for example, semirigid cord or foam rods. Such backing materials are commonly used to prevent caulking materials from being wasted by being pushed too deeply into the joint. The joint sealing composite structure described hereinabove is then placed within the joint with its seam adjacent the backing material, as may be seen in FIG. 9. When the joint sealing composite is in place, a source of electrical potential 37, as may be seen in FIG. 10, is connected across the resistance wire which is carried by the joint sealing material. The electrical power source must have sufficient potential to raise the temperature of the uncured elastomeric material to cause foaming thereof by virtue of the blowing agent. As may be seen from FIG. 11, as the foam forms, the joint between the edges of the strip 21 is forced open and the tube expands and wedges itself within the joint automatically adjusting for unevenness in joint dimensions. As the foaming progresses, the joint completely gives way allowing the elastomeric material to completely fill the space between the backing 33 and the tape 21 as may be seen from FIG. 12. The result is a joint which minimizes the possibility of getting sealant on the faces of the building. It is neat, clean, accurate, requires little skill and is not subject to either tensile or compressive failure.

Various modifications of the above-described invention are possible. For example, the tape 32, which is applied to the joint between the edges of the strip 21, may be made of a low density thermoplastic material such as polyethylene. The application of heat then causes melting of the polyethylene to provide for easier bursting of the seam. This joint tape is preferably a different color from the strip 21 to provide an easy means of identifying the side of the joint sealing member which is to be first inserted into the joint. While the system has been described with respect to a backing member, it is to be understood that a reasonably good seal can be obtained by using the joint sealing material alone without a backing strip. Although the incorporation of electrical heating means as described is advantageous, it will be realized that this element may be omitted and heat may be applied manually.

Various other modifications and variations of the present invention will become obvious to those skilled in the art from a consideration of the foregoing description. It is, therefore, to be understood that within the scope of the appended claims the invention may be practices otherwise than as specifically described.

I claim:

1. A joint sealing composite comprising:
   a tubular jacket having means associated therewith for causing said jacket to open longitudinally upon application of pressure from within, said means including a longitudinally slit in the wall of said tubular jacket and a longitudinally oriented tape adhered over said slit, and
   a quantity of uncured elastomeric silicone material surrounded by said tubular jacket,
   said elastomeric material including as an ingredient a heat activatable blowing agent for causing said elastomeric material to foam upon application of heat thereby providing pressure from within said tubular jacket.

2. A joint sealing composite as defined in claim 1 and further including electrical resistance heating means in said elastomeric material to provide heat for activating said blowing agent.

3. A joint sealing material as defined in claim 1 wherein said tape is of thermoplastic material.